US010678788B2

(12) United States Patent
Macnicol et al.

(10) Patent No.: US 10,678,788 B2
(45) Date of Patent: Jun. 9, 2020

(54) COLUMNAR CACHING IN TIERED STORAGE

(71) Applicant: Oracle International Corporation, Redwood Shores, CA (US)

(72) Inventors: Roger D. Macnicol, Hummelstown, PA (US); Viral Shah, Cupertino, CA (US); Xia Hua, Mountain View, CA (US); Jesse Kamp, Castro Valley, CA (US); Shasank K. Chavan, Menlo Park, CA (US); Maria Colgan, Menlo Park, CA (US); Tirthankar Lahiri, Palo Alto, CA (US); Adrian Tsz Him Ng, Redwood City, CA (US); Krishnan Meiyyappan, Fremont, CA (US); Amit Ganesh, San Jose, CA (US); Juan R. Loaiza, Woodside, CA (US); Kothanda Umamageswaran, Sunnyvale, CA (US); Yiran Qin, Emeryville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 617 days.

(21) Appl. No.: 15/331,599

(22) Filed: Oct. 21, 2016

(65) Prior Publication Data

US 2017/0116269 A1 Apr. 27, 2017

Related U.S. Application Data

(60) Provisional application No. 62/245,193, filed on Oct. 22, 2015.

(51) Int. Cl.
*G06F 16/2453* (2019.01)
*G06F 16/22* (2019.01)
(Continued)

(52) U.S. Cl.
CPC ........ *G06F 16/24539* (2019.01); *G06F 3/061* (2013.01); *G06F 3/065* (2013.01);
(Continued)

(58) Field of Classification Search
CPC .... G06F 16/24539; G06F 16/221; G06F 3/06; G06F 12/0811; G06F 12/0897
See application file for complete search history.

(56) References Cited

U.S. PATENT DOCUMENTS

| 4,782,325 A | 11/1988 | Jeppsson et al. |
| 5,487,164 A | 1/1996 | Kirchhofer et al. |

(Continued)

FOREIGN PATENT DOCUMENTS

| EP | 2 608 070 A1 | 6/2013 |
| GB | 1 332 631 A | 10/1973 |

(Continued)

OTHER PUBLICATIONS

Umamageswarn, U.S. Appl. No. 15/410,496, filed Jan. 19, 2017, Interview Summary, dated Jan. 23, 2019.

(Continued)

*Primary Examiner* — Cam Y T Truong
(74) *Attorney, Agent, or Firm* — Hickman Palermo Becker Bingham LLP

(57) ABSTRACT

Techniques are provided for storing in in-memory unit (IMU) in a lower-storage tier and copying the IMU to DRAM when needed for query processing. Techniques are also provided for copying IMUs to lower tiers of storage when evicted from the cache of higher tiers of storage. Techniques are provided for implementing functionality of IMUs within a storage system, to enable database servers to push tasks, such as filtering, to the storage system where the storage system may access IMUs within its own memory to perform the tasks. Metadata associated with a set of data (Continued)

may be used to indicate whether an IMU for the data should be created by the database server machine or within the storage system.

34 Claims, 7 Drawing Sheets

(51) Int. Cl.
*G06F 3/06* (2006.01)
*G06F 12/0811* (2016.01)
*G06F 12/0897* (2016.01)

(52) U.S. Cl.
CPC ............ *G06F 3/067* (2013.01); *G06F 3/0647* (2013.01); *G06F 12/0811* (2013.01); *G06F 12/0897* (2013.01); *G06F 16/22* (2019.01); *G06F 16/221* (2019.01); *G06F 2212/1016* (2013.01); *G06F 2212/163* (2013.01); *G06F 2212/225* (2013.01)

(56) References Cited

U.S. PATENT DOCUMENTS

| | | | |
|---|---|---|---|
| 5,504,890 A | 4/1996 | Sanford | |
| 5,742,792 A | 4/1998 | Yanai et al. | |
| 5,778,430 A | 7/1998 | Ish et al. | |
| 5,870,759 A | 2/1999 | Bauer et al. | |
| 6,009,432 A | 12/1999 | Tarin | |
| 6,044,367 A | 3/2000 | Wolff | |
| 6,886,084 B2 | 4/2005 | Kawashima et al. | |
| 7,136,970 B2 | 11/2006 | Yoshiya et al. | |
| 7,149,769 B2 | 12/2006 | Lubbers et al. | |
| 7,228,354 B2 | 6/2007 | Chambliss et al. | |
| 7,237,027 B1 | 6/2007 | Raccah et al. | |
| 7,370,068 B1 | 5/2008 | Pham et al. | |
| 7,761,425 B1 | 7/2010 | Erickson et al. | |
| 7,895,216 B2 | 2/2011 | Longshaw et al. | |
| 8,433,684 B2 | 4/2013 | Munoz | |
| 8,856,484 B2 | 10/2014 | Ben-Tsion et al. | |
| 9,251,210 B2 | 2/2016 | Chaudhry et al. | |
| 9,292,564 B2 | 3/2016 | Kamp et al. | |
| 9,916,352 B2 | 3/2018 | Chaudhry et al. | |
| 9,952,782 B1 | 4/2018 | Chandrasekaran | |
| 2002/0143755 A1 | 10/2002 | Wynblatt et al. | |
| 2003/0046396 A1 | 3/2003 | Richter et al. | |
| 2003/0217071 A1 | 11/2003 | Kobayashi et al. | |
| 2004/0003087 A1 | 1/2004 | Chambliss et al. | |
| 2004/0062106 A1 | 4/2004 | Ramesh et al. | |
| 2004/0193570 A1 | 9/2004 | Yaegar | |
| 2005/0033756 A1 | 2/2005 | Kotomatharayil | |
| 2005/0055380 A1 | 3/2005 | Thompson et al. | |
| 2005/0120025 A1 | 6/2005 | Rodriguez et al. | |
| 2005/0165798 A1 | 7/2005 | Cherkauer et al. | |
| 2006/0064405 A1 | 3/2006 | Jiang et al. | |
| 2006/0173833 A1 | 8/2006 | Purcell et al. | |
| 2006/0224551 A1 | 10/2006 | Lariba-Pey | |
| 2007/0156957 A1 | 7/2007 | McHardy et al. | |
| 2007/0198608 A1* | 8/2007 | Prahlad ............. G06F 16/24575 | |
| 2007/0239680 A1 | 10/2007 | Oztekin et al. | |
| 2008/0016074 A1 | 1/2008 | Ben-Dyke et al. | |
| 2008/0059492 A1 | 3/2008 | Tarin | |
| 2008/0104283 A1 | 5/2008 | Shin et al. | |
| 2008/0147599 A1 | 6/2008 | Young-Lai | |
| 2008/0177803 A1 | 7/2008 | Fineberg et al. | |
| 2008/0222311 A1 | 9/2008 | Lee et al. | |
| 2008/0222311 A1 | 9/2008 | Lee | |
| 2008/0244209 A1 | 10/2008 | Seelam et al. | |
| 2008/0256250 A1 | 10/2008 | Wakefield et al. | |
| 2008/0281784 A1 | 11/2008 | Zane et al. | |
| 2008/0281865 A1 | 11/2008 | Price et al. | |
| 2009/0024384 A1 | 1/2009 | Kobayashi et al. | |
| 2009/0034377 A1 | 2/2009 | English et al. | |
| 2009/0063591 A1 | 3/2009 | Betten et al. | |
| 2009/0119295 A1 | 5/2009 | Chou et al. | |
| 2009/0307290 A1 | 12/2009 | Barsness et al. | |
| 2010/0082648 A1 | 4/2010 | Potapov | |
| 2010/0122026 A1 | 5/2010 | Umamageswaran et al. | |
| 2010/0211577 A1 | 8/2010 | Shimizu et al. | |
| 2010/0235335 A1 | 9/2010 | Heman et al. | |
| 2010/0250549 A1 | 9/2010 | Muller et al. | |
| 2010/0325352 A1 | 12/2010 | Schuette et al. | |
| 2011/0029569 A1 | 2/2011 | Ganesh et al. | |
| 2011/0066791 A1 | 3/2011 | Goyal et al. | |
| 2011/0099179 A1 | 4/2011 | Balebail | |
| 2011/0138123 A1 | 6/2011 | Aditya et al. | |
| 2012/0159099 A1* | 6/2012 | Lindamood ......... G06F 11/2094 711/162 |
| 2012/0173515 A1 | 7/2012 | Jeong et al. | |
| 2012/0323971 A1 | 12/2012 | Pasupuleti | |
| 2013/0132674 A1 | 5/2013 | Sundrani | |
| 2014/0040218 A1 | 2/2014 | Kimura et al. | |
| 2014/0067792 A1* | 3/2014 | Erdogan ................ G06F 16/27 707/718 |
| 2014/0075493 A1 | 3/2014 | Krishnan et al. | |
| 2014/0214754 A1* | 7/2014 | Li ..................... G06F 16/24524 707/603 |
| 2015/0088811 A1 | 3/2015 | Hase et al. | |
| 2015/0088822 A1 | 3/2015 | Raja et al. | |
| 2015/0088824 A1 | 3/2015 | Kamp et al. | |
| 2015/0088830 A1* | 3/2015 | Kamp ................. G06F 11/2058 707/648 |
| 2015/0088919 A1* | 3/2015 | Hunter ............. G06F 16/24535 707/759 |
| 2015/0088926 A1 | 3/2015 | Chavan et al. | |
| 2015/0089125 A1 | 3/2015 | Mukherjee et al. | |
| 2015/0089134 A1 | 3/2015 | Mukherjee et al. | |
| 2015/0100556 A1 | 4/2015 | Sekiguchi | |
| 2016/0077750 A1* | 3/2016 | Erdmann .............. G06F 3/0647 711/114 |
| 2016/0147833 A1 | 5/2016 | Chaudhry et al. | |
| 2016/0224660 A1* | 8/2016 | Munk .................. G06F 16/316 |
| 2017/0060918 A1 | 3/2017 | Iyer | |
| 2017/0116252 A1 | 4/2017 | Krishnaswamy | |
| 2017/0166136 A1 | 4/2017 | Manicol | |
| 2017/0206199 A1 | 7/2017 | Umamageswaran | |
| 2019/0102412 A1 | 4/2019 | Macnicol et al. | |

FOREIGN PATENT DOCUMENTS

GB       2 505 185 A       2/2014
WO    WO 2007/078444 A1    7/2007

OTHER PUBLICATIONS

KD Nuggets, "Apache Arrow and Apache Parquet: Why We Needed Different Projects for Columnar Data, on Disk and In-Memory", www.kdnuggets.com/2017/02/apache-arrow-parquet-columnar-data, Feb. 2017, 8pgs.
Zhang Ho et al., "In-Memory Big Data Management and Processing: A Suryery", IEEE Transactions on Knowledge and Data Engineering, vol. 27, No. 7, dated Jul. 31, 2015, 30 pages.
Vishal Sikka et al., "Efficient Transaction Processing in SAP Hana Database", Proceedings of the 2012, International Conference on Management of Data, dated Jan. 31, 2012, 12 pages.
Schaffner et al., "A Hybrid Row-Column OLTP Database Architecture for Operational Reporting" Business Intelleigence for the Real-Time Enterprise: Second International Workshop, dated Aug. 24, 2008, 14 pgs.
Zhe, Li, et al., "PERF join: an alternative to two-way semijoin and Bloomjoin" Proceedings of the 1995 ACM, New York. NY, US., 1995, pp. 187-144.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.

(56) References Cited

OTHER PUBLICATIONS

Phipps, Colin:, "Mapping Deflated Files", Internet Article, dated Jan. 6, 2013, http://zsync.moria.org.uk/paper/ch03s02.html, 3 pages.
Oracle Database Administrator's Guide, 11g Release 2 (11.2), Chapter 26, Feb. 2010, 54 pages. http://download.oracle.com/docs/cd/E11882_01/server.112/e10595.pdf.
Oracle Database Administrator's Guide, 10g Release 2 (10.2), Chapter 24, May 2006, 34 pages. http://download.oracle.com/docs/cd/B19306_01/server.102/b14231.pdf.
O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.
Nirmesh, Malviya, "Recovery Algorithms for In-Memory OLTP Databases", Master of Science Thesis, dated Jul. 1, 2012, 66 pages.
Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.
Loizos, M., et al., "Improving distributed join efficiency with extended bloom filter operations", Advanced Networking and Applications, 2007. AINA '07., 21st international Conf. IEEE, May 1, 2007.
Khalid Sayood:, "Introduction to data Compression", Morgan Kaufmann Publisher, dated Dec. 1996, 4 pages.
IBM, "A Scheduling Algorithm for Processing Mutually Exclusive Workloads in a Multi-System Configuration", dated Aug. 19, 2002, IEEE, 3 pages.
Farber et al., "SAP HANA Database—Data Management for Modern Business Applications", SIGMOD Record, dated Dec. 2011, vol. 40, No. 4, 8 pages.
U.S. Appl. No. 14/337,179, filed 074/21/2014, Notice of Allowance, dated Jul. 29, 2015.
U.S. Appl. No. 14/337,179, filed Jul. 21, 2014, Office Action, dated Dec. 29, 2014.
U.S. Appl. No. 14/337,179, filed Jul. 21, 2014, Notice of Allowance, dated Nov. 3, 2015.
U.S. Appl. No. 14/337,179, filed Jul. 21, 2014, Interview Summary, dated Jun. 17, 2015.
U.S. Appl. No. 14/337,179, filed Jul. 21, 2014, Final Office Action, dated Apr. 10, 2015.
U.S. Appl. No. 12/563,073, filed Sep. 18, 2009, Office Action, dated Jun. 30, 2011.
U.S. Appl. No. 12/563,073, filed Sep. 18, 2009, Notice of Allowance, dated Dec. 27, 2011.
Umamageswaran, U.S. Appl. No. 15/410,496, filed Jan. 19, 2017, Interview Summary, dated Jul. 8, 2019.
Umamageswaran, U.S. Appl. No. 15/410,496, filed Jan. 19, 2017, Advisory Action, dated Jul. 22, 2019.
Umamageswaran, U.S. Appl. No. 15/410,496, filed Jan. 19, 2017, Final Office Action, dated Apr. 26, 2019.
Oracle, "Using the Database Resource Manager", Chapter 24, Using the Database Resource Manager, dated, 34 pages.
Oracle, "Managing Resource Allocation with Oracle Database Resource Manager", Chapter 26, Managing Resource Allocation with Oracle Database Resource Manager. Dated, 54 pages.
Hung, Thanh, "New Objective Function for Vertical Partitioning in Database System", dated 2008, Processing of the Spring Young Researchers Colloquium on Database and Information Systems, dated 2008, 4 pages.
Umamageswaran, U.S. Appl. No. 15/410,496, filed Jan. 19, 2017, Notice of Allowance, dated Jan. 9, 2020.

\* cited by examiner

COLUMNAR CACHING IN TIERED STORAGE

CROSS-REFERENCE TO RELATED APPLICATIONS; BENEFIT CLAIM

This application claims the benefit of Provisional Appln. 62/245,193, filed Oct. 22, 2015, the entire contents of which is hereby incorporated by reference as if fully set forth herein, under 35 U.S.C. § 119(e).

FIELD OF THE INVENTION

The present invention relates to database systems and, more specifically, to swapping in-memory units between different tiers of storage.

BACKGROUND

One way to improve data access times in a relational database system is to pre-load into volatile memory either an entire database object, or portions thereof. For example, operations that involve a table T1 may be performed faster if a copy of table T1 has been pre-loaded into volatile memory. Techniques for pre-loading database objects, or portions thereof, into volatile memory are described, for example, in U.S. Pat. No. 9,292,564 (the "Mirroring Patent"), which is incorporated herein by this reference.

Within volatile memory, in-memory copies of database objects (or portions thereof) are stored in In-memory Units ("IMUs"). The data stored in an IMU is referred to as a chunk. Any given chunk may include all data from a database object or a subset of the data from a database object. For example, data from a table T1 may be divided into four chunks, which may be respectively loaded into four distinct IMUs.

As explained in the Mirroring Patent, the format of data in an IMU may be different than the format in which the same data is stored on persistent storage. For example, the format used to store data from table T on disk (the "persistent-format") may be row-major, while the format used to store the same data in volatile memory (the "mirror-format") may be column-major. In addition, some or all of the data within an IMU may be compressed. When some or all of the data within an IMU is compressed, the IMU may be referred to as an In-memory Compression Unit ("IMCU").

The amount of data that can be loaded into IMUs is constrained by the amount of available volatile memory. Consequently, to effectively leverage the IMUs, it is necessary to intelligently select which elements (e.g. tables, partitions, columns, etc.) are loaded into the IMUs. The database elements that are selected for loading into IMUs are referred to herein as the "to-be-mirrored elements".

Ideally, at any given time, the volatile memory that is available for storing IMUs will be filled with chunks from the database elements that are currently being accessed the most heavily. Unfortunately, which elements are most heavily accessed changes over time. For example, during a period in which table T1 is being accessed heavily, mirroring chunks of table T1 in volatile memory may achieve the greatest benefit. However, at a later time when table T1 is not being accessed, it may be more beneficial to use the volatile memory that was occupied by the chunks of table T1 to cache chunks of a different table T2 that is being more heavily accessed. Techniques for dynamically changing which database elements are mirrored in volatile memory are described in U.S. patent application Ser. No. 14/922,086, the entire contents of which are incorporated herein by reference.

Regardless of how the system determines the to-be-mirrored elements, it is possible that elements that were previously selected as to-be-mirrored elements are no longer selected as to-be-mirrored elements. Such elements are evicted from volatile memory to free up space for newly-selected to-be-mirrored elements. Once an element has been evicted from volatile memory, subsequent requests for data items in that element must obtain the data items in the persistent-format. Obtaining the data items in the persistent-format may involve reading the data items from disk, or accessing a copy of a disk block that has previously been loaded into a buffer cache. Accessing a mirror copy of the data items, in the mirror format, is no longer possible because the mirror copy has been evicted from volatile memory to make room for the currently selected to-be-mirrored elements.

Thus, using conventional techniques, the data items of an element are typically either available in a mirror format from very fast storage (volatile memory), or only available in the persistent-format (from disk or cache). This all-or-nothing approach to mirroring data is inefficient for systems that have one or more tiers of storage that have performance characteristics between volatile memory and magnetic disks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
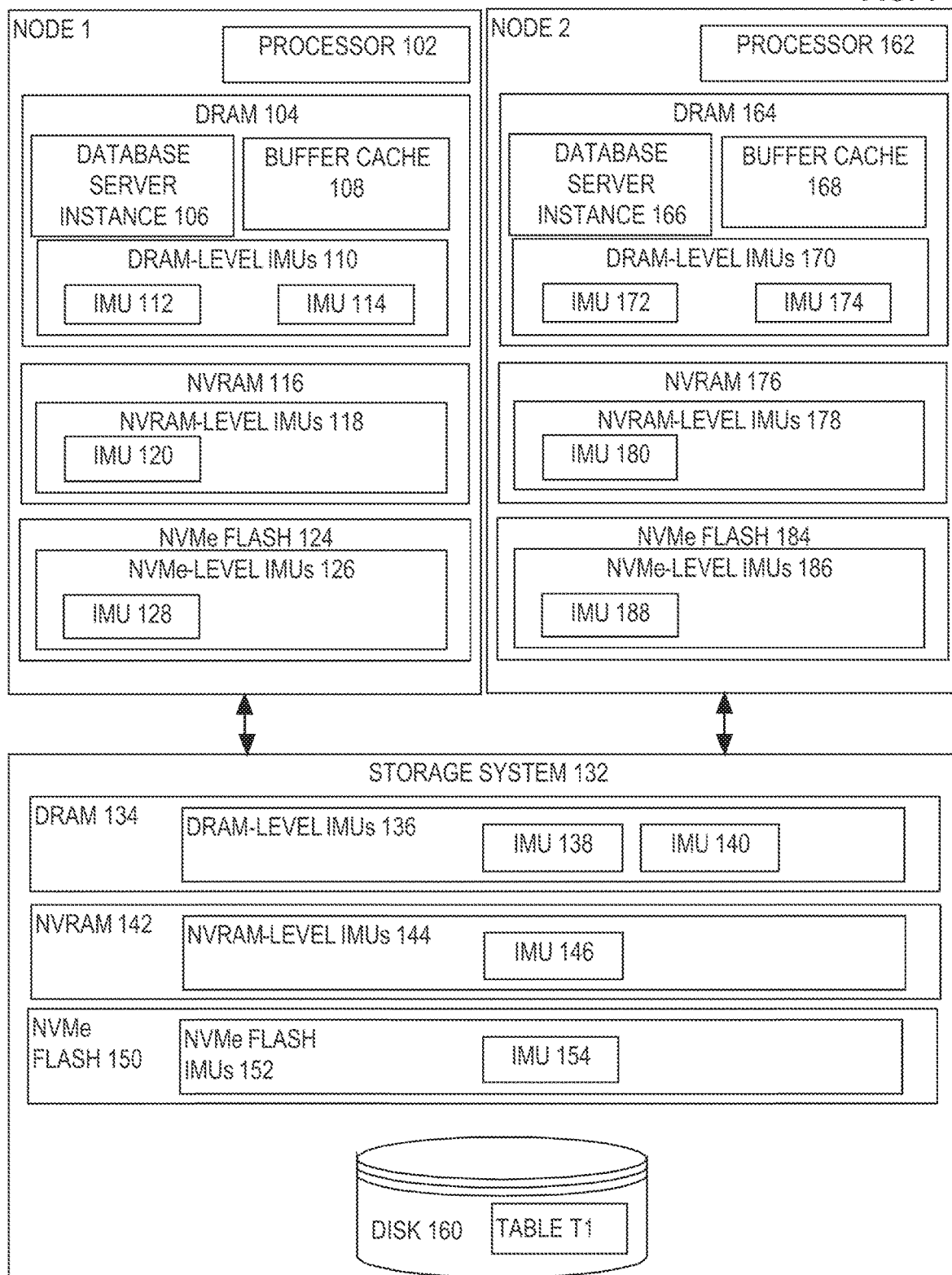
FIG. 1 is a block diagram of a computer system in which both the server nodes and the storage system have multiples tiers of storage, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Rather than employ an all-or-nothing approach to mirroring data, the techniques described herein involve storing mirror-format data at different tiers of storage. As time passes and it becomes necessary to evict an IMU that stores mirror-format data from a particular chunk from a particular level of storage, the IMU is moved to a lower level tier of storage rather than being deleted entirely. Thus, a copy of the mirror-format IMU continues to exist, but overhead associated with obtaining data from the IMU increases. However, the increased overhead is still significantly less than what would be required to rebuild from scratch, in volatile memory, the mirror-format IMU of the chunk when the corresponding chunk begins to be heavily accessed again.

In addition to moving mirror-format IMUs between levels of storage, techniques are provided for initially pre-loading IMUs into storage levels that are below DRAM. For example, when a load-triggering event occurs to cause an IMU to be initially constructed and loaded, the IMU may be created in both the DRAM level of storage and in a NVRAM level of storage. The DRAM-level copy of the particular IMU may be used until evicted. After that IMU is evicted from DRAM, the NVRAM copy of the IMU remains. The next time the IMU is needed by the database server, the IMU may simply be copied from NVRAM to DRAM. The process of copying the IMU from NVRAM to DRAM is several magnitudes faster than rebuilding the IMU in DRAM based on persistent-format data obtained from disk.

By pre-loading mirror-format IMUs into storage levels below (i.e. slower than) the DRAM level, a significantly higher number of mirror-format IMUs may be maintained within a database system. This is particularly true because such lower tiers of storage can be significantly less expensive than DRAM. Consequently, it is economically feasible for database systems to have significantly more storage available at those lower levels.

Techniques are also provided for pushing the functionality of creating and using IMUs to the storage system. The availability of storage-system-maintained IMUs may significantly increase performance of query processing when database servers push work to the storage system using techniques such as those described in U.S. Pat. No. 8,825,678, the entire contents of which are incorporated herein by reference.

In particular, the storage system may pre-load chunks of database objects into IMUs in any one of the storage system's own tiers of storage. Database server instances may then communicate higher-level database operations (including but not limited to scan/filter and aggregate operations) to the storage system, and have the storage system perform some or all of the work required by the operations using IMUs loaded in its own memory. For example, assume that the on-disk version of table T1 stores data in row-major format. When table T1 is heavily used, the storage system may preload, into its own volatile memory, an IMU containing values from a column c1, of a table T1, in column-major format. A database server instance may then instruct the storage system to process a filter condition involving column c1. To process the filter condition, the storage system may make use of the IMU, rather than performing the operation based on row-major data read from the on-disk copy of table T1.

When the storage system needs to evict the IMU from the storage system's volatile memory, the storage system may first copy the IMU to a lower-tier of storage within the storage system, such as NVMe FLASH. Consequently, when that mirror-format IMU is needed again, the storage system may simply copy the IMU from its NVMe FLASH to its DRAM, rather than reconstruct the IMU from scratch.

Using the techniques described herein, the larger slower storage tiers may be used to cover against sudden performance degradation in the presence of selective column caching. For example, if a database administrator (DBA) has optimized the DRAM resources of a system by selectively caching hot columns, a query that uses other less frequently used columns can use the columnar data, retrieved temporarily into DRAM, from a slower storage tier.

For Hadoop data, which is typically slow to process due to the Java access layer (SerDe), the benefits of columnar caching of Hadoop splits are even greater. In this case, the columnar cache can be written to the slowest of the tiered storage layer: hard disk. Both because of the typically huge sizes on Hadoop data stores and because the relative performance benefits are still immense.

Database System with Multiple Tiers of IMU Storage

FIG. 1 is a block diagram of a database system that includes multiple tiers of storage. Referring to FIG. 1, the database system includes two nodes (nodes 1 and 2). Node 1 has three server-side tiers of storage: DRAM 104, NVRAM 116 and NVMe FLASH 124. Similarly, node 2 has three server-side tiers of storage: DRAM 164, NVRAM 176 and NVMe FLASH 184.

Each of these server-side storage tiers may be used to store IMUs. Specifically, within node 1, DRAM 104 is used to store DRAM-LEVEL IMUs 110 (IMUs 112 and 114), NVRAM 116 is used to store NVRAM-level IMUs 118 (IMU 120), and NVMe FLASH 124 is used to store NVMe-LEVEL IMUs 126 (IMU 128). Similarly, within node 2, DRAM 164 is used to store DRAM-LEVEL IMUs 170 (IMUs 172 and 174), NVRAM 176 is used to store NVRAM-level IMUs 178 (IMU 180), and NVMe FLASH 184 is used to store NVMe-LEVEL IMUs 186 (IMU 188).

Both of nodes 1 and 2 have access to storage system 132 which includes a disk 160 that persistently stores the database that is managed by the database system. In the embodiment illustrated in FIG. 1, storage system 132 includes four storage-side tiers of storage: DRAM 134, NVRAM 142, NVME FLASH 150 and disk 160. Similar to the tiers in nodes 1 and 2, the tiers in storage system 132 can be used to store IMUs. Specifically, within storage system 132, DRAM 134 is used to store DRAM-LEVEL IMUs 136 (IMUs 138 and 140), NVRAM 142 is used to store NVRAM-level IMUs 144 (IMU 146), and NVMe FLASH 150 is used to store NVMe-LEVEL IMUs 152 (IMU 154). Disk 160 may also store mirror-format IMUs as shall be described in greater deal hereafter.

Processor 102 represents one or more processors that are executing database server instance 106 within node 1. Processor 162 represents one or more processors that are executing database server instance 166 within node 2. Both database server instances 106 and 166 manage a database stored on disk 160 that includes a table T1. Blocks of persistent-format data read from disk 160 by database server instance 106 may be temporarily stored in buffer cache 108. Similarly, blocks of persistent-format data read from disk 160 by database server instance 166 may be temporarily stored in buffer cache 168.

Pushing IMUs Down Storage Tiers Upon Eviction

Upon evicting an IMU from a storage tier of a device, the IMU may be moved to a lower storage tier in the same device. Thus, evicting an IMU in DRAM 104 of node 1 may cause the IMU to be moved to another storage tier (NVRAM 116 or NVMe FLASH 124) within node 1. Similarly, evicting an IMU in DRAM 134 of storage system 132 may cause the IMU to be moved to another storage tier (NVRAM 142, NVMe FLASH 150 or disk 160) of storage system 132.

Figure 2:
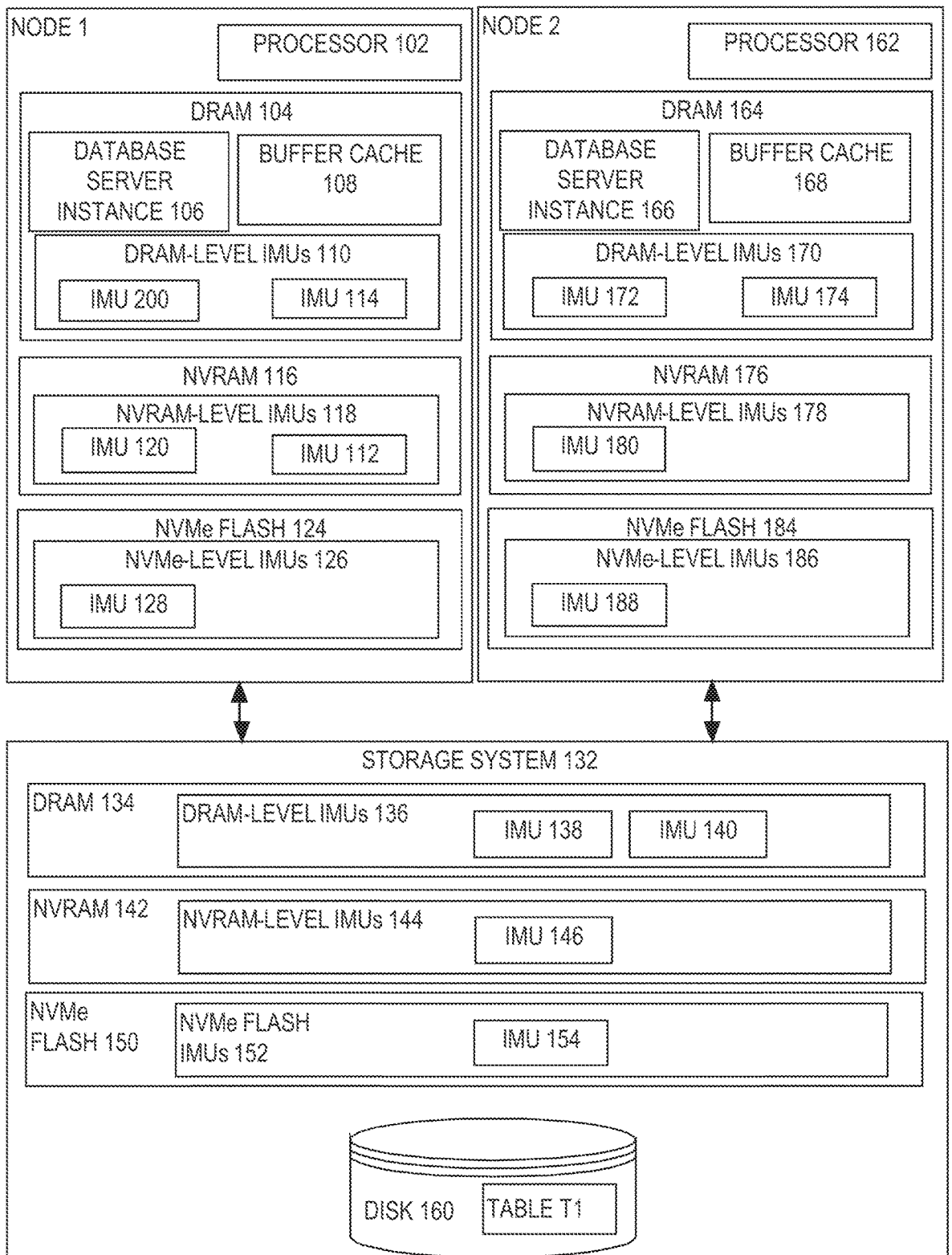
FIG. 2 is a block diagram of the computer system of FIG. 1 in which an in-memory unit has been moved to NVRAM in response to being evicted from DRAM.

For the purpose of explanation, it shall be assumed that the mirror format is column-major, and that data items from table T1 are mirrored in an in-memory unit IMU 112 that was initially loaded into DRAM 104 of node 1, as illustrated in FIG. 1. When IMU 112 is to be evicted from DRAM 104 to make room for more-heavily-used data, IMU 112 may be transferred to a different tier of storage, such as NVRAM 116, which is still faster than magnetic disks. FIG. 2 is a block diagram illustrating the situation in which IMU 112 has been evicted from DRAM 104 and copied into NVRAM 116 in order to make room for a newly loaded IMU 200.

While IMU 112 is stored in NVRAM 116, requests to access the data items from table T1 may cause IMU 112 to be copied from NVRAM 116 back into DRAM 104. Once back in DRAM 104, IMU 112 may be used to process the database request. Copying IMU 112 from NVRAM 116 into DRAM, and then accessing IMU 112 from DRAM 104, may be significantly faster than either reconstructing IMU 112 in DRAM 104 from scratch, or reading the data items of table T1 in row-major format from magnetic disk (or from a cached copy of the corresponding disk blocks).

According to one embodiment, copying IMU 112 from NVRAM 116 into DRAM 104 does not cause IMU 112 to be removed from NVRAM 116. Thus, when IMU 112 is again evicted from DRAM 104, IMU 112 need not be copied again into NVRAM 116, since a copy is IMU 112 still resides in NVRAM 116.

Figure 3:
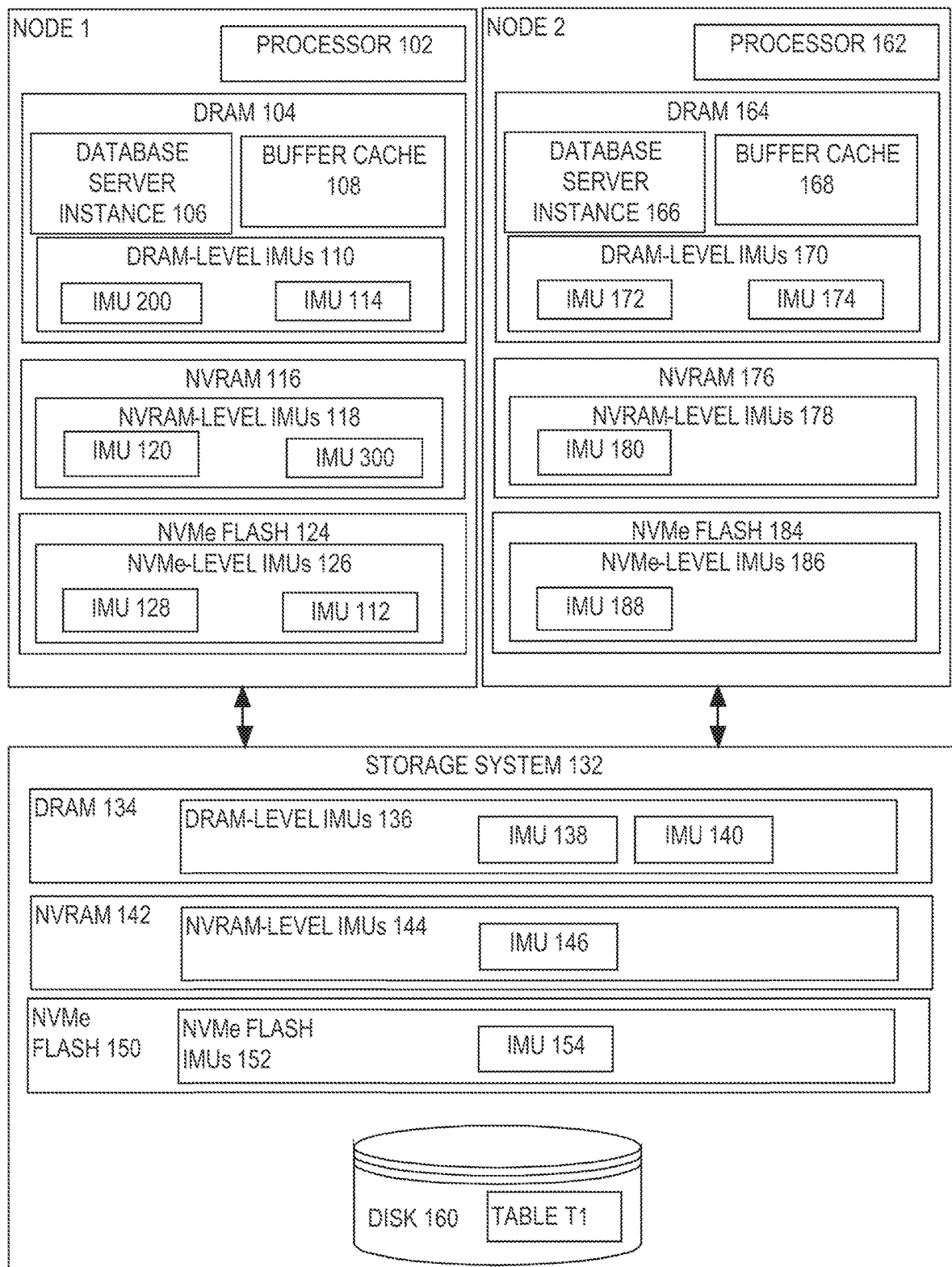
FIG. 3 is a block diagram of the computer system of FIG. 2 in which an in-memory unit has been moved to NVMe FLASH in response to being evicted from NVRAM.

If, at a later point, IMU 112 is to be evicted from NVRAM 116 to make room in NVRAM 116 for a more heavily-used IMU, IMU 112 may be moved to a slower storage tier (e.g. NVMe FLASH 124). FIG. 3 is a block diagram illustrating the situation in which IMU 112 has been evicted from NVRAM 116 and copied into NVMe FLASH 124 in order to make room for an IMU 300.

While IMU 112 is stored in NVMe FLASH 124, requests to access the data items from table T1 may cause IMU 112 to be copied from NVMe FLASH 124 into DRAM 104. Once in DRAM 104, IMU 112 may be used to process the database request. Copying IMU 112 from NVMe FLASH 124 into DRAM, and then accessing IMU 112 from DRAM 104, may be significantly faster than either reconstructing IMU 112 in DRAM 104 from scratch, or reading the data items from table T1 in row-major format from magnetic disk (or from a cached copy of the corresponding disk blocks).

Finally, if IMU 112 is to be evicted from NVMe FLASH 124 to make room in NVMe FLASH 124 for a more heavily-used IMU, IMU 112 may simply be deleted/overwritten, forcing future requests to access data items from table T1 to read the data in row-major format from table T1 on magnetic disk 160 (or from a cached copy of the corresponding persistent-format disk blocks in buffer cache 108).

Figure 4:
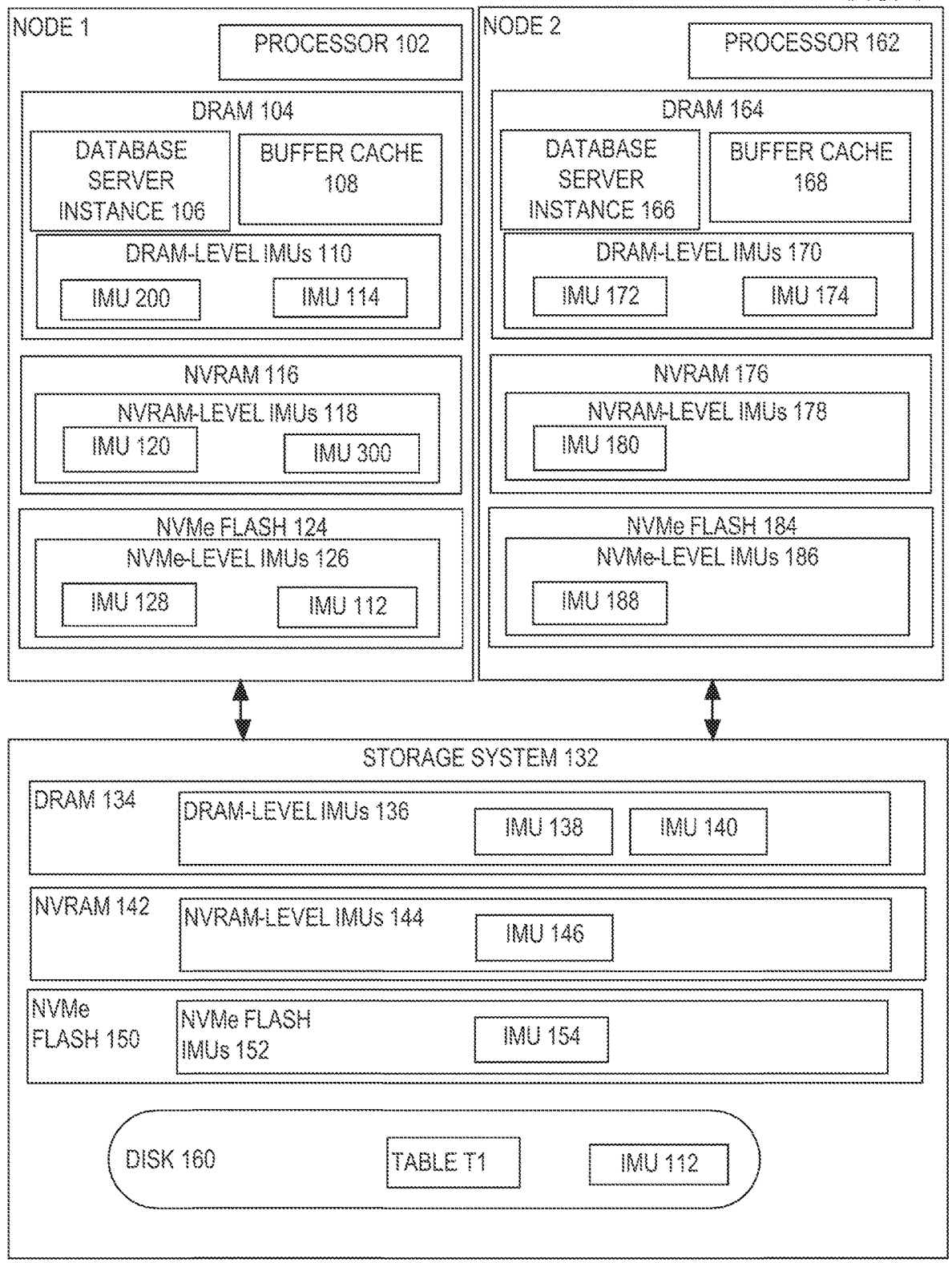
FIG. 4 is a block diagram of the computer system of FIG. 3 in which an in-memory unit has been flushed to disk in response to being evicted from NVMe FLASH.

Alternatively, upon eviction from NVMe FLASH, IMU 112 may be transferred to the same storage tier on which the row-major data (table T1) resides (e.g. magnetic disk 160). FIG. 4 is a block diagram illustrating the situation in which IMU 112 has been evicted from NVMe FLASH 124 and copied to disk 160 in order to make room for an IMU 400.

When, as shown in FIG. 4, both the row-major and mirror-format forms of the same data are on the same tier, no improvement in storage access speed will be realized. However, for certain types of operations, using the mirror-format data may result in more efficient query processing. For example, in cases where a query involves only a single column (or a column group) of a table that contains hundreds of columns, retrieving from disk 160 an IMU that contains the column vector for only that column (or column group) may lead to significantly faster query processing, even though that IMU is stored on the same tier of storage as the row-major data for that table. Thus, in response to a query, database system may load the IMU 112 from disk 160 into DRAM 104, and use the IMU 112 to process the query. Because IMU 112 need not be reconstructed from scratch, and IMU 112 is in mirror-format, many queries may be processed faster than if a copy of IMU 112 were not stored to disk 160 when evicted from NVMe FLASH 124.

Thus, this new approach takes the cache of IMUs across multiple storage types, with increasing resource availability but successively slower performance:

DRAM→NVRAM→NVMe FLASH→disk.

Pushing IMUs Up Storage Tiers Based On Usage

In the example given above, IMU 112 is gradually migrated down the various storage tiers to make room for more heavily accessed data. However, at any point, the access frequency of the data in IMU 112 may increase to the point where the database system determines that IMU 112 should move up in the storage hierarchy. For example, while stored on the NVME FLASH 124, the access frequency of IMU 112 may increase to the point where the database server instance 106 determines that IMU 112 should move up to NVRAM 116. Moving IMU 112 to NVRAM 116 may have the consequence of evicting a different IMU (e.g. IMU 120) from NVRAM 116. The evicted IMU 120 may then be moved down to NVMe FLASH 124.

Multi-Tier Jumps

In the examples given above, IMUs move up one level at a time in the storage tiers, or down one level at a time in the storage tiers. However, the frequency of access of an IMU may change such that an IMU jumps up or down multiple tiers at a time. For example, data that has previously been accessed so rarely that it is not mirrored at all may start being heavily accessed. Under these circumstances, upon creating the IMU in volatile memory, rather than copy the IMU to the NVMe FLASH tier, the IMU may be copied to the NVRAM tier (thereby leapfrogging the NVMe FLASH tier).

In a similar manner, the access frequency of an IMU in volatile memory may decrease such that, upon eviction from DRAM 104, the IMU is moved directly to the NVMe FLASH tier (thereby leapfrogging the NVRAM tier), to disk, or deleted without being moved anywhere (leaving only the corresponding on-disk row-major data).

Inter-Tier Movement Within the Storage System

In the examples described above, IMU 112 is moved down the storage tiers of node 1 to make room for more frequently accessed data, and moves up the storage tiers of node 1 as its access frequency increases. In a similar manner, IMUs may move between the storage-side tiers of storage system 132. Specifically, IMUs evicted from faster storage may move to slower storage, and IMUs in slower storage may be moved to faster storage in response to increased access frequency.

Searching for Data

Because the techniques herein allow an IMU to be present on any one of multiple tiers of storage, a request for a data item may trigger a search for the corresponding IMU. Specifically, in one embodiment, when a table or partition is marked for columnar caching and the table scan driver doesn't find in an IMU for the data in the DRAM cache, it checks the presence of the IMU in the NVRAM cache and, if not there, then in the NVMe FLASH cache. If found in any one of those layers, the IMU is copied from that location into DRAM. This allows the same columnar formats and the same columnar optimizations to be applied to the data without having to constantly maintain the IMU in DRAM, giving a smoother fall off in performance than the all-or-nothing mirror approach. If the data is not found in the columnar cache and it is marked for in-memory caching, then the chunk is read from disk, reformatted into mirror-format and written to a tier of storage.

Multi-Tier Creation of IMUs

According to an embodiment, a single load-triggering event may cause creation of the same IMU, containing data in mirror-format, in multiple tiers of storage. Specifically, at the time an IMU is initially built in DRAM in response to a load-triggering event, a copy of the IMU may be created in one or more of the other storage tiers. The other storage tier(s) in which a copy of the IMU is created may be (a) indicated in user-generated metadata, or (b) decided automatically by the database server based on various factors including usage statistics. For example, user-specified metadata associated with a particular database object may indicate that the object is NVRAM-enabled. Under these circumstances, when an IMU is built in DRAM for data from that object, a copy of the IMU is also created in NVRAM. Similarly, marking a database object as NVMe FLASH-enabled may cause IMUs that contain data from the database object to be created in both DRAM and NVMe FLASH.

If a database object is in-memory enabled without having a specified storage tier, the database server may automatically decide which tier is appropriate based on various factors, including access statistics. For example, the database server may cause an IMU containing less-used data to be created in both DRAM and NVMe FLASH, and cause an IMU containing frequently-used data to be crated in both DRAM and NVRAM. Newly created IMUs containing the most-frequently-used data may simply be maintained in DRAM until evicted. Upon eviction from DRAM, such IMUs may be copied to lower tiers of storage, as explained above.

Alternative Configurations

The examples given above involve a system with three tiers of storage (DRAM, NVRAM, NVMe FLASH) on the server-side, and four tiers of storage (DRAM, NVRAM, NVMe FLASH, Magnetic Disk) on the storage-side. However, the techniques described herein may be applied in any system that has at least two tiers of storage. For example, even in a system that has only DRAM and Magnetic Disk storage, IMUs that are evicted from RAM may be moved to Magnetic Disk, rather than simply deleted. Similarly, upon creation, copies of an IMU may be created both in DRAM and on disk.

Figure 5:
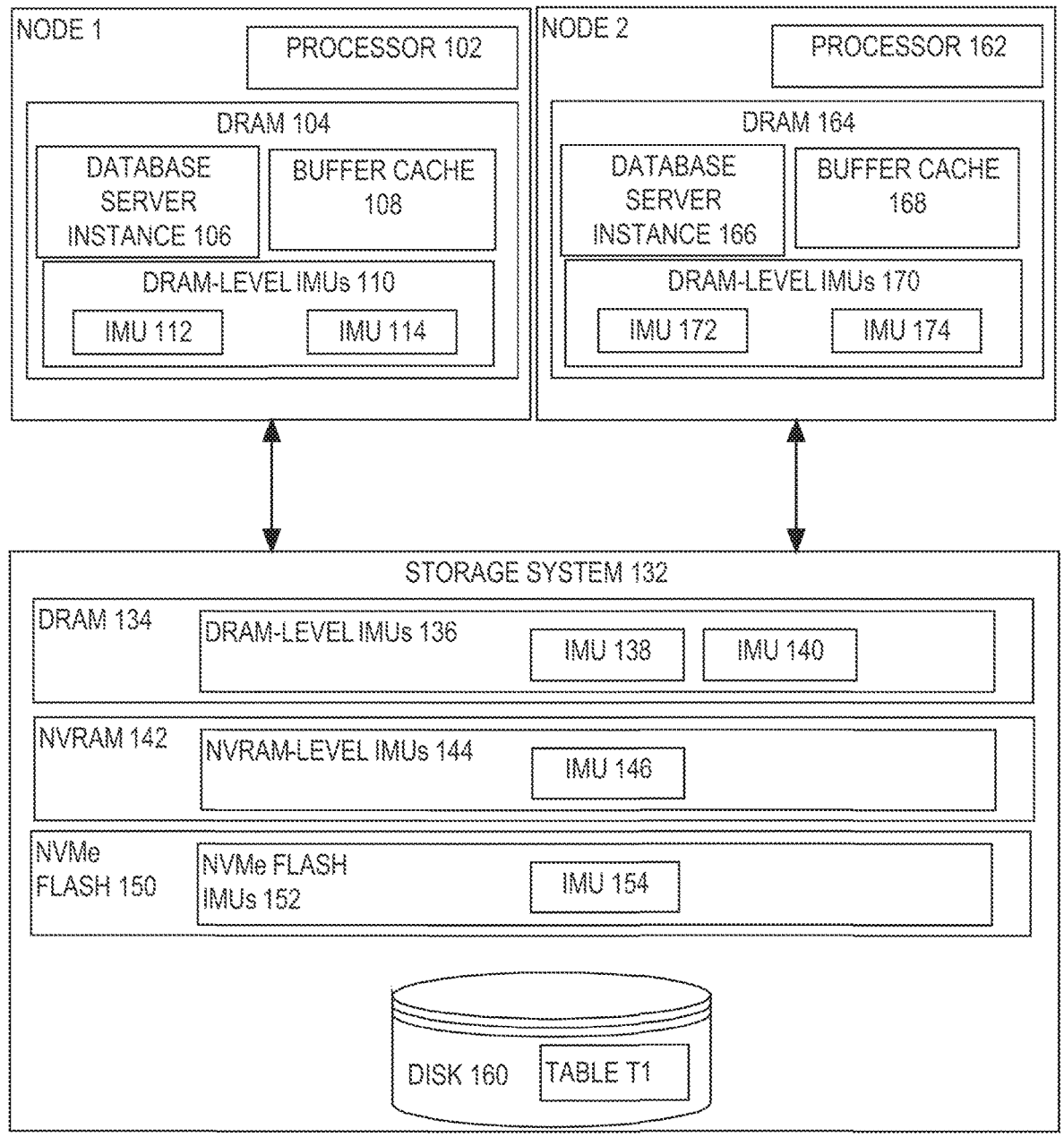
FIG. 5 is a block diagram of a computer system in which the server nodes have only volatile memory and the storage system has four tiers of storage.

FIG. 5 is a block diagram illustrating a system that has only one server-side tier of storage. According to one embodiment, database objects may be marked in-server-memory or in-storage-memory. When an object is marked "in-server-memory", a load-triggering event in node 1 will cause an IMU containing data from the object to be created only in DRAM 104. On the other hand, when an object is marked "in-storage-memory", a load-triggering event in node 1 will cause an IMU containing data from the object to be created in DRAM 134 of storage system 132. In addition to being created in DRAM 134, the load-triggering event may also cause a copy of the IMU to be created one of the other tiers within storage system 132.

For example, the metadata associated with table T1 may indicate "in-storage-memory" and "NVRAM-level". Based on this metadata, a load-triggering event for table T1 may cause an IMU with data from table T1 to be created in both DRAM 134 and NVRAM 142. Similarly, if the metadata associated with table T1 indicated "in-storage-memory" and "NVMe-level", a load-triggering event for table T1 would cause an IMU with data from table T1 to be created in both DRAM 134 and NVRAM 142.

As is evident with the examples given above, the metadata associated with an object may indicate both (a) which device (server or storage) an IMU is to be created in, and (b) the tier(s) in which the IMU is to be created. The lower-tiered copies of an IMU remain even when a higher-tiered copy of the IMU is evicted. As a result, recreation of the IMU at the DRAM level merely involves copying the IMU from the lower-level storage, rather than recreation of the IMU from scratch.

IMU-Based Operations in the Storage System

Using the techniques described herein, IMUs may be made directly accessible to the processing units of storage systems. Consequently, the functionality of creating and using IMUs to perform database operations is also pushed to the storage system. For example, when the task of applying a filter to a set of data is pushed to the storage system, as described in U.S. Pat. No. 8,825,678, storage system 132 may perform that task using mirror-format data stored in an IMU in DRAM 134. If the IMU needed to perform the task is not in DRAM 134, but is at another storage tire within storage system 132, then storage system 132 copies the IMU from the storage tier in which it resides to DRAM 134, and then uses the IMU to perform the requested task. Applying a filter is merely one example of a task for which storage system 132 make use of an IMU in DRAM 134. However, any task for which a database server instance may make use of mirror-format data may be pushed to storage system 132, which now has direct access to mirror-format data in the IMUs stored in any of its storage tiers.

Further, when a database server asks storage system 132 to perform a task that can be accomplished more efficiently with mirror-format data, storage system 132 may itself create the needed IMU if the IMU does not already exist in any of the storage-side storage tiers. As explained above, when creating the IMU in DRAM 134, storage system 132 may simultaneously create the IMU on one or more of the other storage-side storage tiers. Thus, even though the IMU may be subsequently evicted from DRAM 134, the IMU may be quickly copied back into DRAM 134 when needed in the future.

Query Processing Example

Figure 6:
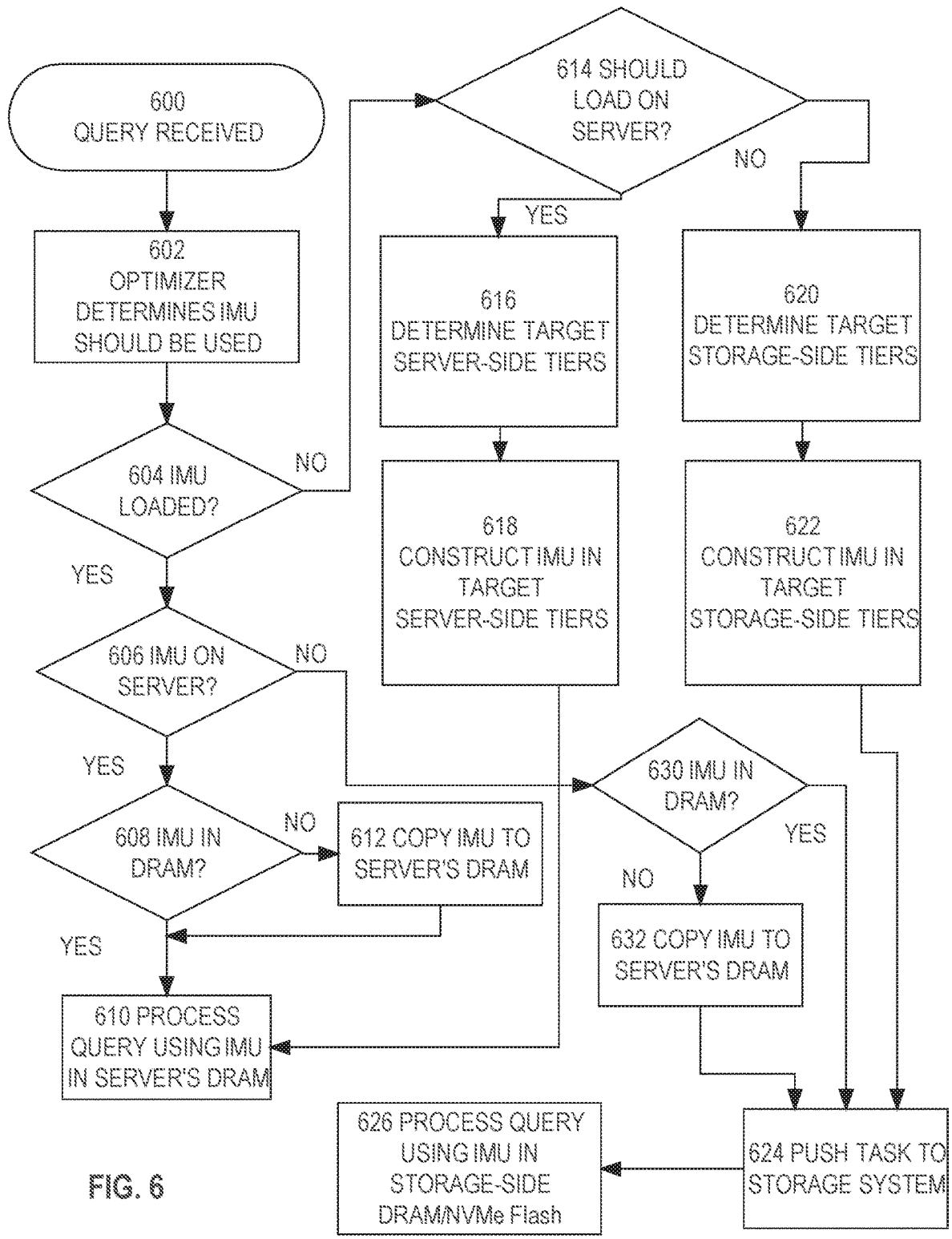
FIG. 6 is a flowchart that illustrates how IMUs, which may not be in volatile memory when a query is received, may be used to process the query, according to an embodiment.

FIG. 6 is a flowchart illustrating steps performed by a computer system in response to receiving a query, according to an embodiment. Referring to FIG. 6, at step 600 the system receives a database query. For the purpose of explanation, it shall be assumed that database server instance 106 receives a query that requires retrieving the rows of table T1 where column c1 has the value "fred". At step 602, the query optimizer of database server instance 106 determines that the filtering required by the query can be handled most efficiently by using an IMU that contains a column vector for column c1.

At step 604, database server instance 106 determines whether the IMU is already loaded (either in node 1 or in storage system 132). If the IMU already loaded, then control proceeds to step 606 to determine which device has the IMU. If the IMU is loaded on the server (i.e. node 1), then control passes to step 608. At step 608, it is determined whether the IMU is at the DRAM tier of the server-side storage. If so, then at step 610 the database server instance 106 processes the query using the IMU in DRAM 104.

If, at step 608, it is determined that the IMU containing the column vector for column c1 is not currently in DRAM, then at step 612 the IMU is copied into DRAM 104 from the storage tier in which the IMU resides. Then, at step 610, the database server instance 106 processes the query using the IMU in DRAM 104.

If, at step 606, it is determined that the needed IMU is loaded in storage system 132 and not in node 1, then control passes to step 630. At step 630, it is determined whether the IMU is at the DRAM tier of the storage-side storage. If so, then at step 624 the task of performing the filter operation is pushed to storage system 132, and in step 626 the storage system 132 performs the filter operation using the IMU in DRAM 134.

If, at step 630, it is determined that the IMU containing the column vector for column c1 is not currently in the storage-side DRAM, then at step 632 the IMU is copied into DRAM 134 from the storage-side storage tier in which the IMU resides. Then, at step 624, the task of performing the filter operation is pushed to storage system 132, and in step 626 the storage system 132 performs the filter operation using the IMU in DRAM 134.

If, at step 604, it is determined that the IMU is not loaded in either node 1 nor within storage system 132, control passes to step 614. At step 614, it is determined where the IMU should be loaded. This determination may be based on a variety of factors. For example, as mentioned above, metadata associated with table T1 may indicate whether the IMU is to be loaded on the server-side or the storage side. Alternatively, the database server instance 106 may determine which device should construct and load the IMU based on factors such as:

how frequently the data is accessed by other nodes,
the CPU load on server vs storage,
occupancy rate of the storage,
how "hot" the data is (with frequently updated data preferred on server side to reduce the cost of refreshes),
access patterns, (large long running queries preferred on storage),
the sizes of the various memory tiers, and
the business of the devices.

As an example, if node 2 frequently accesses column c1, then the database server may decide that the IMU containing the column vector for c1 should be constructed and used within storage system 132. Since both nodes 1 and 2 access data through storage system 132, both nodes would benefit from having the storage system 132 construct and use the IMU. On the other hand, if table T1 is used exclusively by node 1, and node 1 has a large pool of DRAM, then the database server may decide to construct the IMU in DRAM 104 of node 1.

If it is determined that the IMU is to be loaded on the server side, control passes to step 616. At step 616, the "target tiers" of node 1 are determined. The target tiers are the tiers in which to construct the IMU. In some cases, DRAM 104 may be the only target tier. In other cases, the target tiers may include DRAM 104 and one of the other storage tiers of node 1. For example, if the metadata associated with table T1 indicates that the IMU for column c1 is NVRAM-enabled, then the target tiers are both DRAM 104 and NVRAM 116. At step 618, the IMU is constructed in the target tiers. After the IMU has been constructed, in step 610 the server processes the query using the IMU.

Steps 620 and 622 are similar to step 616 and 618 except that the target tiers are storage-side storage tiers. Once the IMU has been created in the storage-side target tiers, the task is pushed to the storage system (step 624), and the storage system performs the task using the IMU that was created in the storage-side DRAM. After performing the task, the storage system may return results of the task to the server in columnar format. The server can cache those results as an IMU within the server machine, and use that IMU to process subsequent queries.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
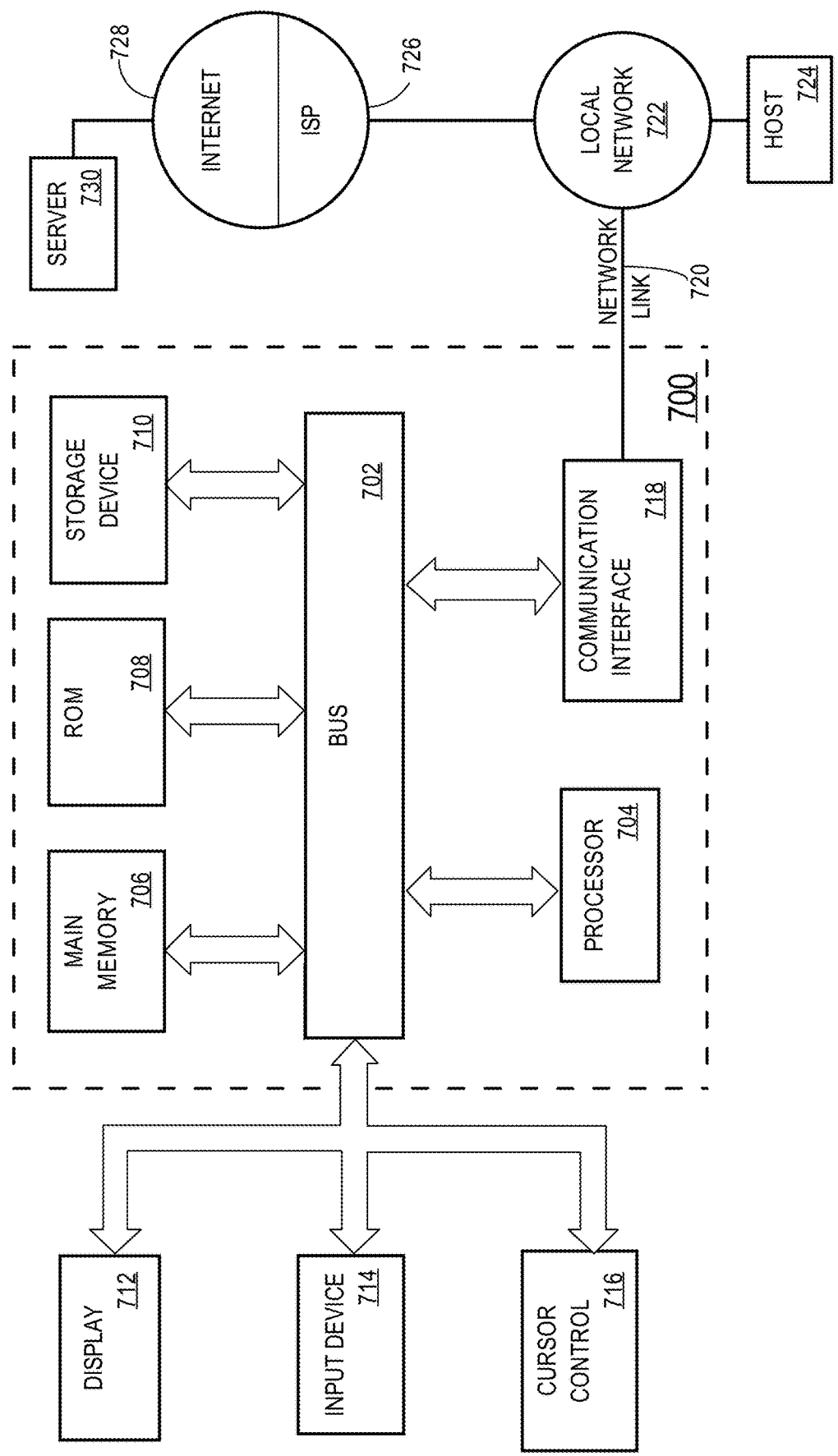
FIG. 7 is a block diagram of a computer system that may be used to implement the techniques described herein, according to an embodiment.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for use in a system that includes a storage tier of persistent storage, a storage tier of volatile memory, and one or more additional storage tiers, comprising:
 storing a persistent-format copy of a set of data, in a persistent-format, on the persistent storage;
 storing a first mirror-format copy of the set of data, in a mirror-format, in a particular storage tier of the one or more additional storage tiers;
 wherein the particular storage tier is separate and distinct from both the persistent storage and the volatile memory;
 wherein the mirror-format is different than the persistent format;
 wherein the particular storage tier has access speeds slower than the volatile memory and faster than the persistent storage;
 in response to a query that requires access to the set of data, determining that:
  no mirror-format copy of the set of data currently resides in the volatile memory; and
  the first mirror-format copy currently resides in the particular storage tier;
 in response to determining that no mirror-format copy of the set of data currently resides in the volatile memory and that the first mirror-format copy currently resides in the particular storage tier, performing the steps of:
  copying the first mirror-format copy from the particular storage tier to the volatile memory to create a second mirror-format copy in the volatile memory; and
  using the second mirror-format copy to process the query;

wherein using the second mirror-format copy to process the query comprises extracting a set of values in columnar format from the second mirror-format copy, and generating a response to the query based, at least in part, on the set of values;

wherein the method is performed by one or more computing devices.

2. The method of claim 1 wherein:

the query is received by a database server instance executing on a server machine; and the volatile memory, the particular storage tier, and the persistent storage are in a storage system that is separate from the server machine.

3. The method of claim 2 wherein the step of using the second mirror-format copy to process the query comprises:

causing the database server instance to communicate a task to the storage system;

the storage system copying the first mirror-format copy to the volatile memory of the storage system; and the storage system performing the task using the second mirror-format copy.

4. The method of claim 3 further comprising the storage system returning results of the task to the database server instance in columnar format, and the database server instance storing the results as an in-memory unit within the server machine.

5. The method of claim 3 wherein the task is a filter or aggregation operation required by the query.

6. The method of claim 2 further comprising, before any mirror-format copy of the set of data exists in the storage system, the storage system responding to a load-triggering event by constructing mirror-format copies of the set of data in at least two storage tiers of the storage system.

7. The method of claim 6 wherein the at least two storage tiers include the volatile memory and at least one solid-state storage tier whose performance is slower than the volatile memory.

8. The method of claim 1 wherein:

the query is received by a database server instance executing on a server machine;

the volatile memory and the particular storage tier are on the server machine; and the persistent storage is in a storage system that is separate from the server machine.

9. The method of claim 8 further comprising, before any mirror-format copy of the set of data exists in the server machine, the server machine responding to a load-triggering event by constructing mirror-format copies of the set of data in at least two storage tiers of the server machine.

10. The method of claim 9 wherein the at least two storage tiers include the volatile memory and at least one solid-state storage tier whose performance is slower than the volatile memory.

11. The method of claim 1, further comprising:

in response to the second mirror-format copy being evicted from the volatile memory, determining that no mirror-format copy of the set of data currently resides in a second particular storage tier;

in response to determining that no mirror-format copy of the set of data current resides in the second particular storage tier, copying the second mirror-format copy from the volatile memory to the second particular storage tier to create a third mirror-format copy in the second particular storage tier;

wherein the second particular storage tier is one of the one or more additional storage tiers;

wherein the second particular storage tier is separate and distinct from both the persistent storage and the volatile memory;

wherein the second particular storage tier has access speeds slower than the volatile memory and faster than the persistent storage.

12. The method of claim 11 wherein:

the persistent storage contains a database managed by a database server instance executing on a server machine;

the set of data is from a table in the database; and the volatile memory, the particular storage tier, the second particular storage tier, and the persistent storage are in a storage system that is separate from the server machine.

13. A method for use in a system that includes a storage system that is operatively coupled to a server machine that is executing a database server instance that manages a database, wherein the system includes a storage tier of persistent storage in the storage system, a storage tier of volatile memory in the server machine, and one or more additional storage tiers, the method comprising:

storing, within the storage system:

a persistent-format copy of a set of data, in a persistent-format, on the storage tier of persistent storage; and a mirror-format copy of the set of data, in a mirror-format, in volatile memory of the storage system;

wherein the volatile memory of the storage system is one of the one or more additional storage tiers;

wherein the volatile memory of the storage system is a storage tier that is distinct and separate from the storage tier of volatile memory of the server machine;

wherein the set of data is from a table in the database managed by the database server instance;

wherein the mirror-format is different than the persistent format;

in response to a query, received by the database server instance, that requires access to the set of data, performing the steps of:

causing the database server instance to communicate a task to the storage system;

the storage system determining that the mirror-format copy resides in the volatile memory of the storage system; and in response to determining that the mirror-format copy resides in the volatile memory of the storage system, the storage system performing the task using the mirror-format copy;

wherein performing the task using the mirror-format copy comprises extracting a set of values in columnar format from the mirror-format copy and performing the task based, at least in part, on the set of values.

14. The method of claim 13 wherein storing the mirror-format copy of the set of data in the volatile memory comprises copying the mirror-format copy from a storage tier, in the storage system, that has slower access rates than the volatile memory and faster access rates than the persistent storage.

15. The method of claim 13 wherein storing the mirror-format copy of the set of data in the volatile memory comprises constructing, by the storage system, the mirror-format copy from the persistent-format copy.

16. The method of claim 15 wherein the storage system constructs the mirror-format copy in both the volatile memory and other storage tier of the storage system in response to a single event, wherein the other storage tier has slower access rates than the volatile memory and faster access rates than the persistent storage.

17. A method for use in a system that includes a storage system that is operatively coupled to a server machine that is executing a database server instance that manages a database, wherein the system includes a storage tier of persistent storage in the storage system, a storage tier of volatile memory in the server machine, and one or more additional storage tiers, the method comprising:
- storing, within the storage system, a persistent-format copy of a set of data, in a persistent-format, on the storage tier of persistent storage;
- wherein the set of data is from a table in the database managed by the database server instance;
- wherein the storage system has volatile memory that is one of the one or more additional storage tiers;
- wherein the volatile memory of the storage system is a storage tier that is distinct and separate from the storage tier of volatile memory of the server machine;
- in response to a load-triggering event, performing steps of:
  - reading metadata associated with the set of data to determine a target device in which to construct a mirror-format copy of the set of data, in a mirror-format;
  - wherein the target device is one of the storage system and the server machine;
  - wherein the mirror-format is different than the persistent format; and
  - using data obtained from the persistent-format copy, constructing the mirror-format copy in volatile memory of the target device;
- using the mirror-format copy in volatile memory of the target device to process a query, wherein processing the query comprises extracting a set of values in columnar format from the mirror-format copy and generating a response to the query based, at least in part, on the set of values.

18. One or more non-transitory computer-readable media for use in a system that includes a storage tier of persistent storage, a storage tier of volatile memory, and one or more additional storage tiers, the one or more non-transitory computer-readable media having stored thereon instructions which, when executed by one or more processors, cause:
- storing a persistent-format copy of a set of data, in a persistent-format, on the persistent storage;
- storing a first mirror-format copy of the set of data, in a mirror-format, in a particular storage tier of the one or more additional storage tiers;
- wherein the particular storage tier is separate and distinct from both the persistent storage and the volatile memory;
- wherein the mirror-format is different than the persistent format;
- wherein the particular storage tier has access speeds slower than the volatile memory and faster than the persistent storage;
- in response to a query that requires access to the set of data, determining that:
  - no mirror-format copy of the set of data currently resides in the volatile memory; and
  - the first mirror-format copy currently resides in the particular storage tier;
- in response to determining that no mirror-format copy of the set of data currently resides in the volatile memory and that the first-mirror format copy currently resides in the particular storage tier, performing steps of:
  - copying the first mirror-format copy from the particular storage tier to the volatile memory to create a second mirror-format copy in the volatile memory; and
  - using the second mirror-format copy to process the query;
  - wherein using the second mirror-format copy to process the query comprises extracting a set of values in columnar format from the second mirror-format copy, and generating a response to the query based, at least in part, on the set of values.

19. The one or more non-transitory computer-readable media of claim 18 wherein:
- the query is received by a database server instance executing on a server machine; and
- the volatile memory, the particular storage tier, and the persistent storage are in a storage system that is separate from the server machine.

20. The one or more non-transitory computer-readable media of claim 19 wherein the step of using the second mirror-format copy to process the query comprises:
- causing the database server instance to communicate a task to the storage system;
- the storage system copying the first mirror-format copy to the volatile memory of the storage system; and
- the storage system performing the task using the second mirror-format copy.

21. The one or more non-transitory computer-readable media of claim 20 storing instructions for causing the storage system to return results of the task to the database server instance in columnar format, and the database server instance to store the results as an in-memory unit within the server machine.

22. The one or more non-transitory computer-readable media of claim 20 wherein the task is a filter or aggregation operation required by the query.

23. The one or more non-transitory computer-readable media of claim 19 storing instructions for causing, before any mirror-format copy of the set of data exists in the storage system, the storage system to respond to a load-triggering event by constructing mirror-format copies of the set of data in at least two storage tiers of the storage system.

24. The one or more non-transitory computer-readable media of claim 23 wherein the at least two storage tiers include the volatile memory and at least one solid-state storage tier whose performance is slower than the volatile memory.

25. The one or more non-transitory computer-readable media of claim 18 wherein:
- the query is received by a database server instance executing on a server machine;
- the volatile memory and the particular storage tier are on the server machine; and
- the persistent storage is in a storage system that is separate from the server machine.

26. The one or more non-transitory computer-readable media of claim 25 storing instructions for causing, before any mirror-format copy of the set of data exists in the server machine, the server machine to respond to a load-triggering event by constructing mirror-format copies of the set of data in at least two storage tiers of the server machine.

27. The one or more non-transitory computer-readable media of claim 26 wherein the at least two storage tiers include the volatile memory and at least one solid-state storage tier whose performance is slower than the volatile memory.

28. The one or more non-transitory computer-readable media of claim 18, wherein the instructions, when executed, further cause:
- in response to the second mirror-format copy being evicted from the volatile memory, determining that no mirror-format copy of the set of data currently resides in a second particular storage tier;
- in response to determining that no mirror-format copy of the set of data current resides in the second particular storage tier, copying the second mirror-format copy from the volatile memory to the second particular storage tier to create a third mirror-format copy in the second particular storage tier;
- wherein the second particular storage tier is one of the one or more additional storage tiers;
- wherein the second particular storage tier is separate and distinct from both the persistent storage and the volatile memory;
- wherein the second particular storage tier has access speeds slower than the volatile memory and faster than the persistent storage.

29. The one or more non-transitory computer-readable media of claim 28 wherein:
- the persistent storage contains a database managed by a database server instance executing on a server machine;
- the set of data is from a table in the database; and
- the volatile memory, the particular storage tier, the second particular storage tier, and the persistent storage are in a storage system that is separate from the server machine.

30. One or more non-transitory computer-readable media storing instructions for execution in a system that includes a storage system that is operatively coupled to a server machine that is executing a database server instance that manages a database, wherein the system includes a storage tier of persistent storage in the storage system, a storage tier of volatile memory in the server machine, and one or more additional storage tiers, which, when executed by one or more processors, cause:
- storing, within the storage system:
    - a persistent-format copy of a set of data, in a persistent-format, on the storage tier of persistent storage; and
    - a mirror-format copy of the set of data, in a mirror-format, in volatile memory of the storage system;
    - wherein the volatile memory of the storage system is one of the one or more additional storage tiers;
    - wherein the volatile memory of the storage system is a storage tier that is distinct and separate from the storage tier of volatile memory of the server machine;
- wherein the set of data is from a table in the database managed by the database server instance;
- wherein the mirror-format is different than the persistent format;
- in response to a query, received by the database server instance, that requires access to the set of data, performing steps of:
    - causing the database server instance to communicate a task to the storage system;
    - the storage system determining that the mirror-format copy resides in the volatile memory of the storage system; and
    - in response to determining that the mirror-format copy resides in the volatile memory of the storage system, the storage system performing the task using the mirror-format copy;
    - wherein performing the task using the mirror-format copy comprises extracting a set of values in columnar format from the mirror-format copy and performing the task based, at least in part, on the set of values.

31. The one or more non-transitory computer-readable media of claim 30 wherein storing the mirror-format copy of the set of data in the volatile memory comprises copying the mirror-format copy from a storage tier, in the storage system, that has slower access rates than the volatile memory and faster access rates than the persistent storage.

32. The one or more non-transitory computer-readable media of claim 30 wherein storing the mirror-format copy of the set of data in the volatile memory comprises constructing, by the storage system, the mirror-format copy from the persistent-format copy.

33. The one or more non-transitory computer-readable media of claim 32 wherein the storage system constructs the mirror-format copy in both the volatile memory and other storage tier of the storage system in response to a single event, wherein the other storage tier has slower access rates than the volatile memory and faster access rates than the persistent storage.

34. One or more non-transitory computer-readable media storing instructions for execution in a system that includes a storage system that is operatively coupled to a server machine that is executing a database server instance that manages a database, wherein the system includes a storage tier of persistent storage in the storage system, a storage tier of volatile memory in the server machine, and one or more additional storage tiers, which, when executed by one or more processors, cause:
- storing, within the storage system, a persistent-format copy of a set of data, in a persistent-format, on the storage tier of persistent storage;
- wherein the set of data is from a table in the database managed by the database server instance;
- wherein the storage system has volatile memory that is one of the one or more additional storage tiers;
- wherein the volatile memory of the storage system is a storage tier that is distinct and separate from the storage tier of volatile memory of the server machine;
- in response to a load-triggering event, performing steps of:
    - reading metadata associated with the set of data to determine a target device in which to construct a mirror-format copy of the set of data, in a mirror-format;
    - wherein the target device is one of the storage system and the server machine;
    - wherein the mirror-format is different than the persistent format; and
    - using data obtained from the persistent-format copy, constructing the mirror-format copy in volatile memory of the target device;
    - using the mirror-format copy in volatile memory of the target device to process a query, wherein processing the query comprises extracting a set of values in columnar format from the mirror-format copy and generating a response to the query based, at least in part, on the set of values.

* * * * *

UNITED STATES PATENT AND TRADEMARK OFFICE
CERTIFICATE OF CORRECTION

| | | |
|---|---|---|
| PATENT NO. | : 10,678,788 B2 | Page 1 of 1 |
| APPLICATION NO. | : 15/331599 | |
| DATED | : June 9, 2020 | |
| INVENTOR(S) | : Macnicol et al. | |

It is certified that error appears in the above-identified patent and that said Letters Patent is hereby corrected as shown below:

On the Title Page

On second page, Column 2, under Other Publications, Line 6, delete "Suryery"," and insert -- Survey", --, therefor.

On second page, Column 2, under Other Publications, Line 12, delete "Intelleigence" and insert -- Intelligence --, therefor.

In the Claims

In Column 14, Line 39, in Claim 13, before "steps" delete "the".

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*